No. 862,768. PATENTED AUG. 6, 1907.
H. STILES.
CYCLE SUPPORTING ATTACHMENT.
APPLICATION FILED APR. 25, 1907.
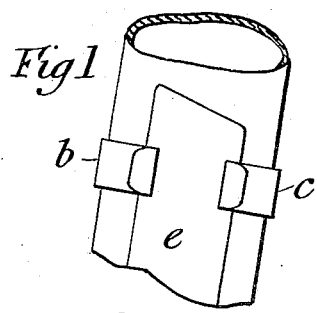
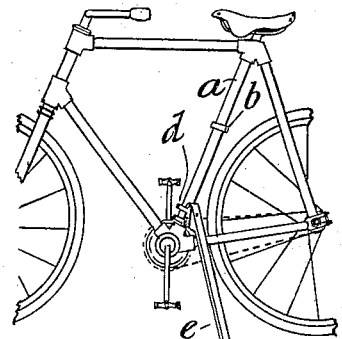
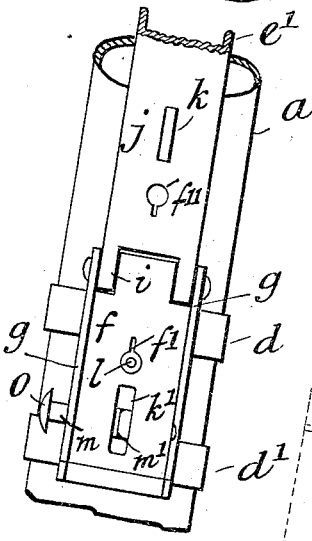
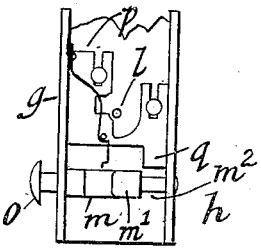
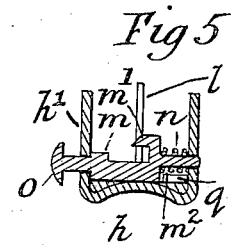
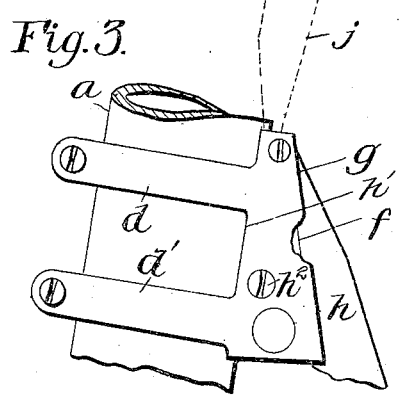
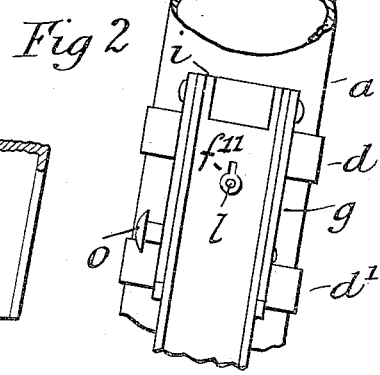
Witnesses.
W. Max. Durall
J. Ginsta.
Inventor.
Henry Stiles
Wilkinson, Fisher & Witherspoon
his attorneys.
THE NORRIS PETERS CO., WASHINGTON, D. C.

UNITED STATES PATENT OFFICE.

HENRY STILES, OF BENDIGO, VICTORIA, AUSTRALIA.

CYCLE-SUPPORTING ATTACHMENT.

No. 862,768.      Specification of Letters Patent.      Patented Aug. 6, 1907.

Application filed April 25, 1907. Serial No. 370,317.

*To all whom it may concern:*

Be it known that I, HENRY STILES, a subject of the King of Great Britain and Ireland, &c., residing at Bendigo, in the State of Victoria, Commonwealth of Australia, have invented certain new and useful Improvements in Cycle-Supporting Attachments; and I do hereby declare the following to be a full, clear, and exact description of the invention, such as will enable others skilled in the art to which it appertains to make and use the same.

Riders of bicycles when unprovided with suitable supports therefor have frequently experienced the difficulty of finding an object against which to rest their machines; and as the latter when not adequately supported are easily caused to fall, many such accidents have resulted with unpleasant consequences. My device overcomes the difficulty, and in a simple and satisfactory manner. It will also prevent such frequent thefts of unattended cycles as now occur, as it provides for a locking device being available. Separate padlocks, chains, and so on, as cycle locking devices, are known, but they are apt to be mislaid or otherwise not on hand when wanted, and they have other drawbacks not found in my device.

In carrying into effect my invention I provide a leg attachment to support the bicycle in a standing position leaning somewhat to one side; this leg when dropped locks or fixes itself in a rigid manner and definitely predetermined position; it also prevents rotation of the wheels by reason of the said leg extending into the path of the pedals; and its lightness and cheapness contribute to its utility. When the leg is placed to act as a support it is fixed, and may be locked against a suitable box. When it is not so to act it is swung upward on a hinge, and is secured out of the rider's way close alongside of a tube of the cycle frame, as will be readily understood by those skilled in the art.

In the accompanying drawings suitable construction is illustrated, but modifications may be made within the spirit of the invention and scope of my claims. For example though one form of lock is illustrated any other suitable kind may be substituted.

Figure 1 shows a front elevation of my attachment with the leg or bar in its upward position, clipped to the seat pillar tube of the bicycle frame. Fig. 2 shows a front view of the same parts with the leg dropped into its downward position with the lower end resting on the ground. Fig. 3 is a side view of my device attached to the said cycle tube, part of the leg being shown in its raised position dotted, and in its dropped position in firm lines. Fig. 4 shows on a smaller scale the device supporting a bicycle, the leg being on the near side of the machine. Fig. 5 is a transverse sectional view showing parts of the lock box. Fig. 6 is a front elevation of parts of the lock box as seen when the face of the box is removed.

In these figures $a$ is the seat pillar tube of the bicycle frame, $b\ c$ are spring arms of a band, clip or clamp secured to its upper part either permanently, or removably; and usually adjustable. Arms $b\ c$ are adapted to retain securely between them the leg or support $e$ when the latter is pressed between them. $d\ d^1$ are lower clamp arms secured and usually adjustable relatively to the said tube $a$. The distance between arms $d\ d^1$ enables them to be affixed one above and the other below the brace tube of a lady's type of bicycle where the said tube meets tube $a$. In some cases I would however not provide for that being done, and would use any other strong clamp or fixing means.

Connected to clamp arms $d\ d^1$ is an obliquely set bearing plate or member $f$, which forms the front of a lock or box designated as a whole by the reference letter $h$, the sides of which are cheeks designated by the letter $h^1$. Its rear is in some cases curved, see Fig. 5, to fit tube $a$. By clips $d$, $d^1$ or other means box $h$ is rigidly held relatively to tube $a$. This box is shown (in side view) with a wide base and narrow top, and within it is any lock, the keyhole of which may be in cheek $h^1$ as at $h^2$; or in the face of plate $f$ as at $f^1$ see Fig. 1. A keyhole to register with the latter is added at $f^{11}$, see below.

At sides of plate $f$ are raised edges, flanges, or lugs, as $g$ to prevent side play of leg $e$, and to protect the same, and its hinge against strain. The latter is marked $i$ and is located at the top of plate $f$ or near thereto. The hinged end of leg $e$ is inclosed between flanges $g$, so that the leg is guarded by the flanges throughout its falling and rising movements. There may be an attachment (not shown) to (or part projecting from) leg $e$ adapted when the leg is raised to grasp or engage tube $a$, instead of using clip $b$, $c$, but no exclusive use of the clip or such attachment is claimed. The leg is usually of steel of channel form in cross section, its flanges being marked $e^1$. This combines strength with lightness, and avoids undue projection from tube $a$ as flanges $e^1$ are on the inner side in Fig. 1 and thus partly inclose tube $a$. $j$ is any suitable face set out or projecting from the base of leg $e$ intended to fit against plate $f$; and face $j$ is located at such an angle that when the two said faces are contacting the leg extends obliquely outward at a suitable angle to the vertical line. The set out or projection of plate $f$ combined with that of face $j$ gives leg $l$ sufficient outward incline from the bicycle. If the whole of the projection or set out were given to plate $f$ then the latter would project too far and either be in the way of the cranks of the pedals or too near their path. $k$ is any suitable hasp or projection on face $j$ to form part of the locking or fixing device. Leg $e$ is provided in some cases with a rubber shoe or end buffer (not shown) to contact with the ground, and act as a wear taking device, but no exclusive claim thereto is made.

Leg $e$ is so hinged that when the cyclist disengages it from its upper fastening it invariably falls so that face $j$ meets the face of plate $f$, and hasp $k$ enters a hole $k^1$ therein; and keyholes $f^1$, $f^{11}$, also register. The hasp by its pressure forces aside the tooth or catch $m^1$ of a bolt $m$, and the bolt being caused to return by a spring $n$ seen in Fig. 5 the hasp becomes fixed in. Then on slightly inclining the cycle the lower end of the leg meets the ground $x$, whereupon the cycle may be left firmly supported. Bolt $m$ projects from the box side and has a head or button $o$ adapted to be pressed in at will by hand to release the hasp and allow raising of bar $e$. If however the lock is used a bolt or member of the lock will (automatically or otherwise) lock bolt $m$. Then to unlock a suitable key will be necessary. An unauthorized person without the key, could not ride off with the bicycle, because leg $e$ would not be movable by him out of the way of the pedals. It is not essential that the leg project outward in a vertical plane. Clamps $b$, $d$, $d^1$ (with box $h$) can be adjusted or partly rotated round tube $a$ to allow the leg to project when down, somewhat towards the rear, as seen in Fig. 4. In Fig. 6 $l$ shows the key post, $p$ the bolt of the lock, and $q$ a part of the said bolt adapted to be pushed into a recess $m^2$ (see Fig. 5) when the key is turned, so as to prevent the button $o$ being movable.

What I do claim as my invention and desire to secure by Letters Patent of the United States is:—

1. In a cycle support the combination of a box $h$ provided with the cheeks $h^1$, and the inclined plate $f$, said plate provided with the hole $k^1$, with the supporting leg $e$ hinged to said box and provided with the inclined face $j$, adapted to fit said plate $f$, between said cheeks, and with a hasp $k$, adapted to enter said hole $k^1$, substantially as described.

2. In a cycle support, the combination of a box $h$ provided with the fastening strips $d$, $d^1$, the cheeks $h^1$, the inclined plate $f$, said plate provided with a hole $k^1$, the keyhole $f^1$ and a hinge pintle, with the supporting leg $e$ fitting said hinge pintle and provided with the hasp $k$, the keyhole $f^{11}$, and the inclined face $j$ adapted to fit said plate $f$, between said cheeks, whereby said hasp enters said hole $k^1$ and said keyholes $f^1$, $f^{11}$ register, substantially as described.

3. In a cycle support, the combination with a lock, of a box $h$ provided with the cheeks $h^1$, inclined plate $f$, said plate provided with the hole $k^1$ and with the keyhole $f^1$, with the supporting leg $e$ hinged to said box and provided with the inclined face $j$ adapted to fit said plate $f$ between said cheeks, with a hasp $k$ and with a keyhole $f^{11}$, the said keyholes $f^1$ and $f^{11}$ adapted to register when the said leg is down, and said hasp adapted to enter said hole $k^1$ and be locked therein, substantially as described.

In witness whereof I have hereunto set my hand in the presence of two witnesses.

HENRY STILES.

Witnesses:
GEORGE G. TURRI,
BEATRICE M. LOWE.